United States Patent
Villadsen et al.

(10) Patent No.: US 9,760,346 B2
(45) Date of Patent: Sep. 12, 2017

(54) DEEPLY PARALLEL SOURCE CODE COMPILATION

(71) Applicant: Microsoft Technology Licensing, LLC, Redmond, WA (US)

(72) Inventors: Peter Villadsen, Sammamish, WA (US); Gustavo Plancarte, Woodinville, WA (US); Tanmoy Dutta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/907,709

(22) Filed: May 31, 2013

(65) Prior Publication Data

US 2014/0359587 A1    Dec. 4, 2014

(51) Int. Cl.
*G06F 9/45*    (2006.01)

(52) U.S. Cl.
CPC ............... *G06F 8/41* (2013.01); *G06F 8/451* (2013.01); *G06F 8/427* (2013.01); *G06F 8/437* (2013.01)

(58) Field of Classification Search
CPC .............. G06F 8/41–8/44; G06F 8/447; G06F 8/45–8/453; G06F 8/456
See application file for complete search history.

(56) References Cited

U.S. PATENT DOCUMENTS

| | | | | |
|---|---|---|---|---|
| 5,276,880 A | * | 1/1994 | Platoff | G06F 8/427 717/143 |
| 6,061,513 A | * | 5/2000 | Scandura | G06F 8/74 717/142 |
| 7,487,498 B2 | * | 2/2009 | Hogg et al. | 717/162 |
| 7,512,936 B2 | * | 3/2009 | Schneider | G06F 21/14 704/8 |

(Continued)

FOREIGN PATENT DOCUMENTS

WO    WO 2012/081024 A1 *    6/2012

OTHER PUBLICATIONS

Gross, T., et al., Parallel Compilation for a Parallel Machine, PLDI '89 Proceedings of the ACM SIGPLAN 1989 Conference on Programming language design and implementation, 1989, pp. 91-100, [retrieved on Sep. 26, 2014], Retrieved from the Internet: <URL:http://dl.acm.org/>.*

(Continued)

*Primary Examiner* — Geoffrey St Leger

(57) ABSTRACT

Abstract Syntax Trees (ASTs) are generated using the source code of a programming language that include information relating to the structure of the program. The generation of the ASTs may be performed in parallel. The types are split into a number of modules (e.g. configurable) that form an assembly. During the different stages of the compilation process, each module may be compiled in parallel. As the different modules are being compiled (e.g. in parallel), compiler metadata from the different modules may be writ- (Continued)

ten to a repository accessible by the different compilation processes. After flowing through the compilation pipeline, each of the enriched ASTs are used for code generation where they are transformed into the target language (e.g. a code stream that can be executed on hardware). The executable code is then stored as part of the assembly. The storage of the code may also be performed in parallel.

18 Claims, 9 Drawing Sheets

(56) References Cited

U.S. PATENT DOCUMENTS

| | | | | |
|---|---|---|---|---|
| 7,559,051 | B2* | 7/2009 | De Oliveira Kastrup Pereira | G06F 8/45 717/112 |
| 8,245,203 | B2* | 8/2012 | Becker | 717/140 |
| 8,296,744 | B2* | 10/2012 | Langworthy et al. | 717/143 |
| 8,302,080 | B2* | 10/2012 | Wassermann | G06F 8/00 717/131 |
| 8,495,603 | B2* | 7/2013 | Archer | G06F 8/443 717/140 |
| 2003/0106049 | A1* | 6/2003 | Ungar | G06F 8/427 717/143 |
| 2003/0200536 | A1* | 10/2003 | Stuefe | G06F 8/20 717/140 |
| 2005/0102649 | A1* | 5/2005 | Hogg et al. | 717/100 |
| 2005/0246680 | A1* | 11/2005 | De Oliveira Kastrup Pereira | G06F 8/45 717/106 |
| 2009/0007065 | A1* | 1/2009 | Becker | 717/110 |
| 2010/0088665 | A1* | 4/2010 | Langworthy et al. | 717/104 |
| 2013/0167129 | A1* | 6/2013 | Emani | G06F 8/41 717/151 |
| 2014/0253344 | A1* | 9/2014 | Heller | 340/870.03 |

OTHER PUBLICATIONS

Komathukattil, D., Evaluating Speedup in Parallel Compilers, UNF Digital Commons, 2012, 76 pages, [retrieved on Sep. 26, 2014], Retrieved from the Internet: <URL:http://digitalcommons.unf.edu/etd/417/>.*

Dalton, A. R., Distributed Java Compiler: Implementation and Evaluation, Masters Thesis, Appalachian State University, Aug. 2004, 73 pages, [retrieved on Oct. 29, 2015], Retrieved from the Internet: <URL:http://www.researchgate.net/>.*

Seshadri, V., et al., Semantic Analysis in a Concurrent Compiler, Proceedings of the ACM SIGPLAN 1988 conference on Programming language design and implementation, 1988, pp. 233-240, [retrieved on Sep. 26, 2014], Retrieved from the Internet: <URL:http://dl.acm.org/>.*

Pool, M., distcc, a fast free distributed compiler, linux.conf.au, Adelaide, 2004, 11 pages, [retrieved on Sep. 26, 2014], Retrieved from the Internet: <URL:https://bilger.nu/litteratur/distcc-lca-2004.pdf>.*

"International Search Report & Written Opinion for PCT Patent Application No. PCT/US14/39643", Mailed Date: Aug. 11, 2014, Filed Date: May 28, 2014, 8 Pages.

Skillicorn, et al., "Compiling in Parallel", In Journal of Parallel and Distributed Computing, Apr. 1, 1993, vol. 17, Issue 4, pp. 337-352.

European Office Action in Application 14733845.3, mailed Sep. 2, 2016, 4 pages.

* cited by examiner

┌─ 300

Phase 1: Traverse types in ASTs

```
class ABCMyClass1          class DEFMyClass2
{                          {                          • • •
}                          }
```

Phase 2: For each type, traverse the methods (metadata defined, inheritance defined, parameters, constructors, ...)

```
class MyClass1 extends MyClass2    class MyClass2
{                                  {
public void foo()                  public MyClass1 bar()      • • •
{                                  {
}                                  }
}                                  }
```

Phase 3: For each method in the types: Traverse the bodies (i.e. the statements and expressions in the methods) and generate the code (including calls to the methods that were defined in Phase 2)

```
class MyClass1 extends MyClass2    class MyClass2
{                                  {
public void foo()                  public MyClass1 bar()
{                                  {
System.Console.WriteLine("foo");     MyClass1 c = new MyClass1();   • • •
}                                  c.foo();
}                                  return c;
                                   }
                                   }
```

Phase 4: Saving the modules to files. In this phase the executable instructions are written to modules.

FIG. 3

Mobile Computing Device

DEEPLY PARALLEL SOURCE CODE COMPILATION

BACKGROUND

Compilers are used to convert source code written in a higher level programming language to a lower level language before executing on a computing device. For example, source code written using the X++ programming language may be compiled to create an executable program that may execute on one or more computing devices. A compiler may perform different operations, including lexical analysis, semantic analysis, code generation, and the like. Compiling a small amount of source code is generally performed quickly, whereas compiling a large amount of source code may take a considerable amount of time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Abstract Syntax Trees (ASTs) are generated using the source code of a programming language that include information relating to the structure of the program. For example, a compiler front-end (e.g. a parser) may analyze the source code, determine each of the types/classes defined by the source code and generate ASTs. The generation of the ASTs may be performed in parallel. The generated ASTs are refined to include further semantic information as they proceed through a pipeline during the compilation process. The types/classes are split into modules that form an assembly. The number of different modules used may be configured and/or automatically determined. For example, a module may be created for each type, a module may be created for a predetermined number of types, and the like. During the different stages of the compilation process, each module may be compiled in parallel. As the different modules are being compiled (e.g. in parallel), information from the different modules is written to a repository. The repository may be accessed by the different compilation processes. After flowing through the compilation pipeline, each of the enriched ASTs are used for code generation where they are transformed into the target language (e.g. a code stream that can be executed on hardware). The executable code within each of the modules is then stored as part of the assembly. The storage of the code may also be performed in parallel. The different compilation threads are allocated to run on a number of processors (e.g. two, four, eight, up to as many processors are available). Generally, the compilation speed for the source code is determined by the available hardware resources.

BRIEF DESCRIPTION OF THE DRAWINGS

FIG. 3 shows examples from exemplary phases of the compilation process;

DETAILED DESCRIPTION

Figure 1:
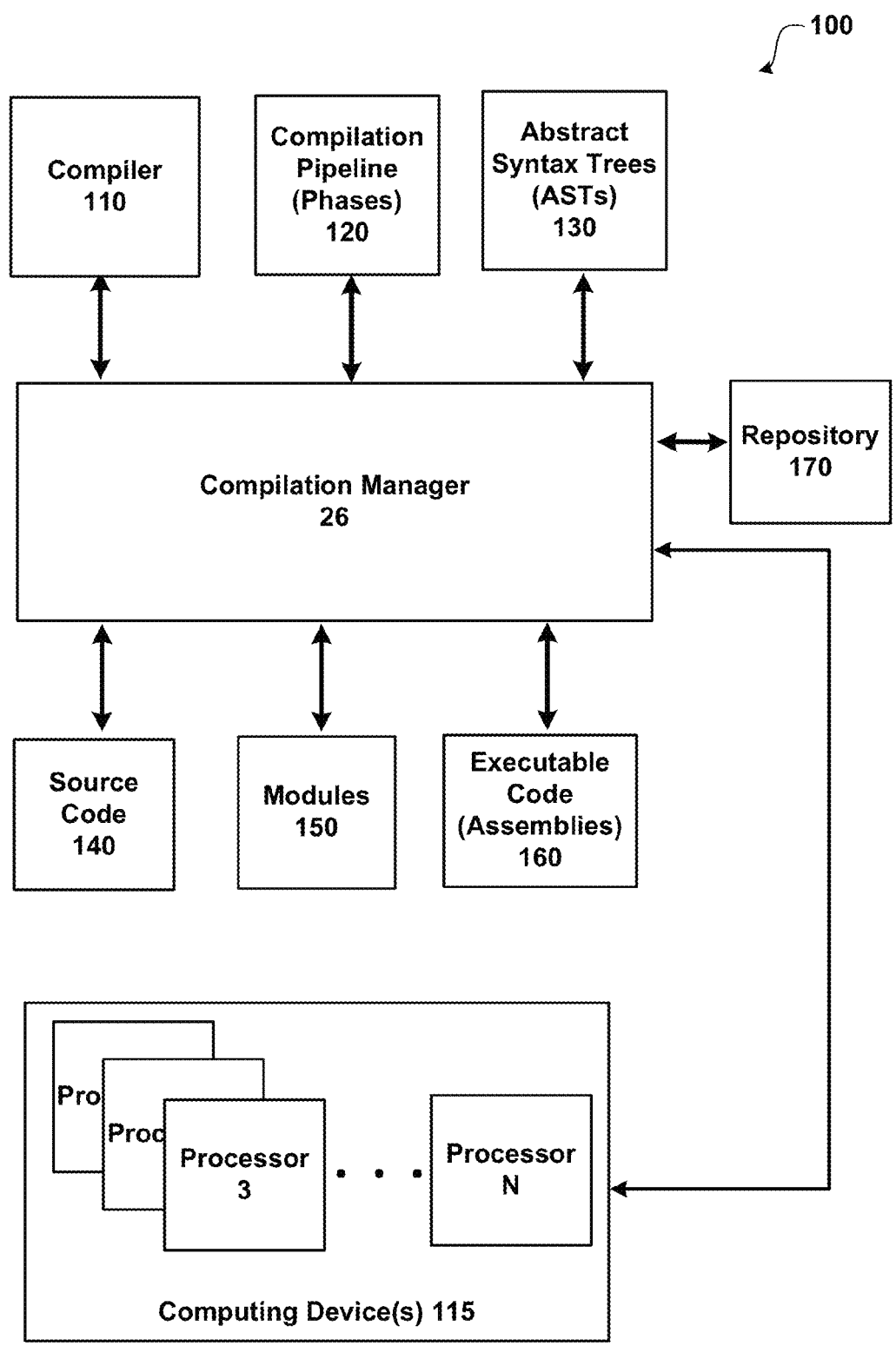
FIG. 1 shows a system for deeply parallel source code compilation.

Referring now to the drawings, in which like numerals represent like elements, various embodiment will be described elements, various embodiment will be described.

FIG. 1 shows a system for deeply parallel source code compilation.

As illustrated, system 100 includes compilation manager 26, compiler(s) 110, compilation pipeline 120, Abstract Syntax Trees (ASTs) 130, source code 140, modules 150, executable code 160, repository 170, and computing device(s) 115 including one or more processors (e.g. processors 1-N).

Generally, compilation manager 26 is configured to compile source code in parallel. For example, instead of compiling source code serially, the source code is split into a number of different threads for compilation based on type/class definitions. Compilation manager 26 accesses source code 140 for compilation by compiler 110.

Source code 140 is source code written in a programming language that is to be compiled into executable code that may be executed on one or more computing devices. Source code 140 may be written using one or more programming languages (e.g. C, C++, C#, X++, VISUAL BASIC, VISUAL BASIC .NET). According to an embodiment, source code 140 is written in a .NET compliant language, such as X++ code that has similarities to C# and/or other .NET compliant languages.

Compiler 110 is configured to compile source code 140 using different phases/passes that are defined in the compilation pipeline 120. Compiler 110 may be configured using different methods. According to an embodiment, compiler 110 is configured to compile source code 140 to create MICROSOFT .NET application(s). One or more compilers may be used. For example, a different compiler may be associated with each source code file that is written using a different programming language.

Compilation manager 26 accesses source code 140 (one or more files) and during a parsing phase in compilation pipeline 120, compiler 110 generates Abstract Syntax Trees (ASTs). ASTs include information relating to the structure of the program. For example, a parser may access source code 140, analyze the source code 140, determine the structure of the source code 140 and generate ASTs. As the parser recognizes the language constructs in the source code, it builds an AST that includes nodes that are abstractions of the source code artifact (e.g. X++ artifact) that they represent. The generation of the ASTs may be performed in parallel.

The generated ASTs are refined to include further semantic information as they proceed through pipeline 120 during the compilation process. Pipeline 120 may include any number of passes that are hooked into the pipeline. The pipeline will then run the passes in sequence. Each pass can extract information as needed and/or modify the code (i.e. ASTs) that goes into the next pass. A pass in this context, is an entity that acts on the source code, either by applying some rule or by modifying it. The first pass is the parser that reads the source code, parses it and produces an Abstract Syntax Tree (AST) that subsequent passes work on.

The types determined when generating the ASTs are split into modules that form an assembly. The number of different modules used may be configured. For example, a module for each type, a module for a predetermined number of types, and the like. During the different stages of the compilation process, each module may be compiled in parallel.

As the different modules are being compiled (e.g. in parallel), information from the compiler (e.g. compiler metadata) from the different modules may be written to a repository, such as repository 170 (e.g. a database). The compiler metadata may be written to a file and/or a memory location. The repository may be accessed by the different threads during the parallel computation during the different phases of the compilation process for the source code.

After flowing through the compilation pipeline, each of the enriched ASTs are used for code generation where they are transformed into the target language (e.g. a code stream that can be executed on hardware). The executable code is then stored as part of the assembly 160. The storage of the code may also be performed in parallel.

System 100 as illustrated comprises computing device(s) 115 that each include one or more processors (e.g. processors 1-N). Compilation manager 26 may manage and allocate the different compilation threads to available processors. Generally, the compilation speed for the source code is determined by the available hardware resources (e.g. a number of available processors (one-N)). Compilation manager 26 may be part of a code development system and/or other system/service. More details are provided below.

Figure 2:
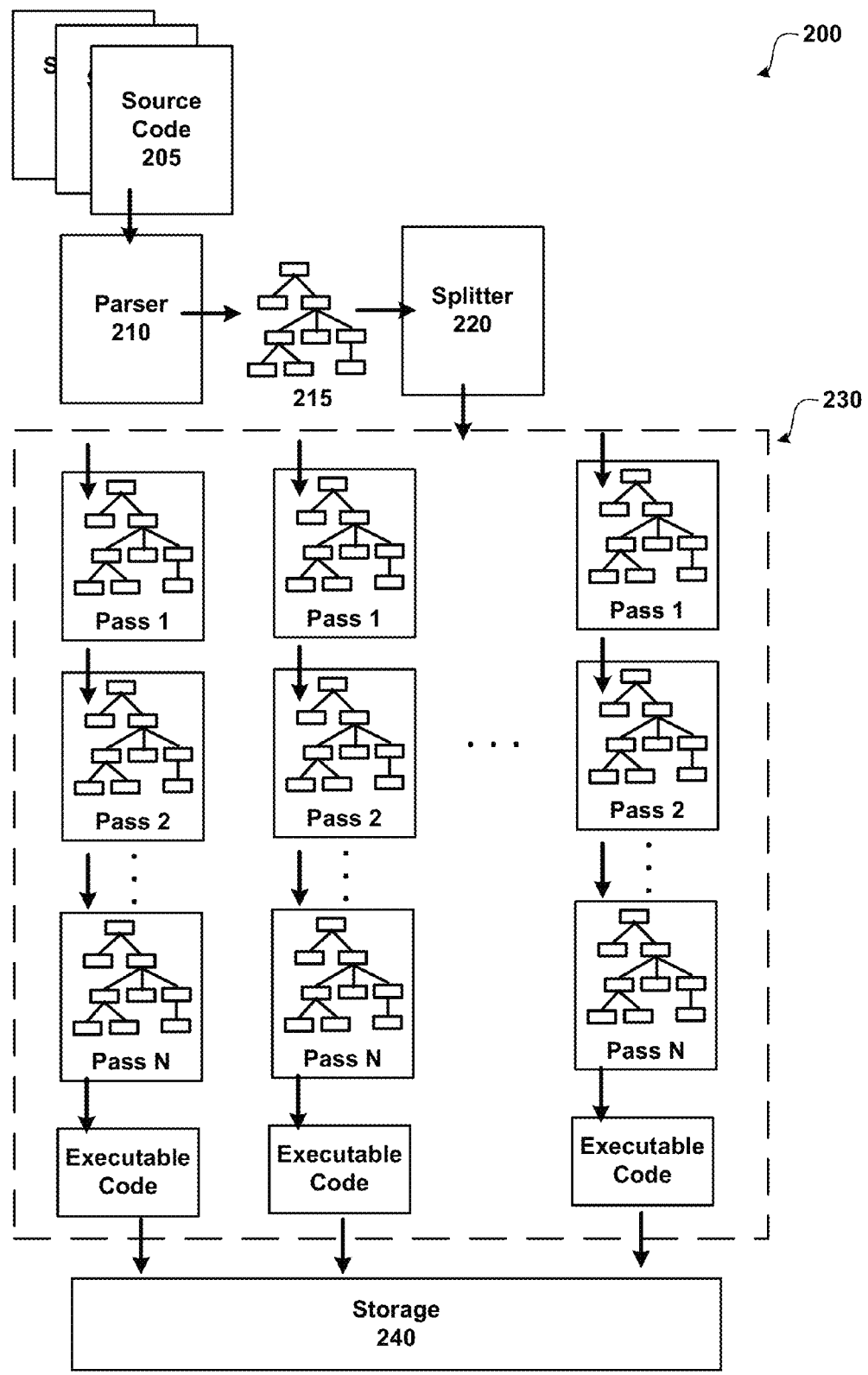
FIG. 2 shows a pipeline for compiling source code in parallel.

FIG. 2 shows a pipeline for compiling source code in parallel. As illustrated, FIG. 2 includes source code file(s) 205, parser 210, ASTs 215, splitter 220, N passes 230, and storage 240.

Parser 210 accesses source code 205 (one or more files) and generates Abstract Syntax Trees (ASTs). ASTs include information relating to the structure of the program. For example, parser 210 may be a bottom up parser that analyzes source code 205, determines each of the types that are defined and generate corresponding ASTs. The generation of the ASTs may be performed in parallel. For example, a process may be created to parse each source code file in parallel.

After ASTs 215 are generated, splitter 220 splits the determined types/classes into different modules that each may be processed independently and in parallel. The number of different modules used may be configured and/or automatically determined (e.g. using information relating to available processing resources). One or more types/classes may be associated with a module. Source code 205 may define a large amount of types/classes (e.g. 10,000, 20,000, 30,000, . . . ) while other source code 205 may define a smaller number of classes (e.g. 10, 20, 100). The number of modules selected may depend on a variety of factors/conditions (e.g. available processes, number of determined types, available memory, . . . ). According to an embodiment, the types are split by splitter 220 based on the type name. For example, types having the same first x number of letters are split to the same module. The class names may be hashed and split using the hash. Classes may be split on an identifier, a type, and the like. Generally, any method that uniquely maps a name to a module may be used to split the types among the modules.

Pipeline 230 may include any number of passes for each different compilation thread depending on the compilation process. Each pass within a pipeline can either extract information as needed, or modify the code that goes into the next pass, or otherwise enrich the AST. A pass in this context, is an entity that acts on the source code, either by applying some rule or by modifying it. For example, one pass may define methods, another pass may define inheritances, and another pass may generate the code. According to an embodiment, each module represents a pipeline that is run in parallel with the other pipeline processing.

After the executable code is generated it is stored in storage 240. The storage of the executable code may occur in parallel. According to an embodiment, the executable code defines modules that define .NET assemblies that are associated with an application.

FIG. 3 shows examples from exemplary phases of the compilation process.

As illustrated, FIG. 3 shows four exemplary phases.

Phase 1 illustrates traversing the types in the ASTs to determine the different classes. In the current example, Phase 1 shows example class names determined in the initial generation of the ASTs. Before Phase 2, the different classes are split into different modules (e.g. according to class name and/or determined using some other method).

Phase 2 shows extending the ASTs to include more information such as traversing each of the methods to define inheritance, parameters, constructors, metadata, and the like.

Phase 3 illustrates traversing the bodies (e.g. the statements and expressions in the methods) and generating the code including the calls to the methods defined in Phase 2.

Phase 4 shows saving each of the modules to files. During phase 4 the executable code is written to modules (e.g. .NET modules) and stored on a storage device and/or memory. Phase 4 may be performed in parallel.

As can be seen, each pass through the compilation pipeline adds more information.

Figure 4:
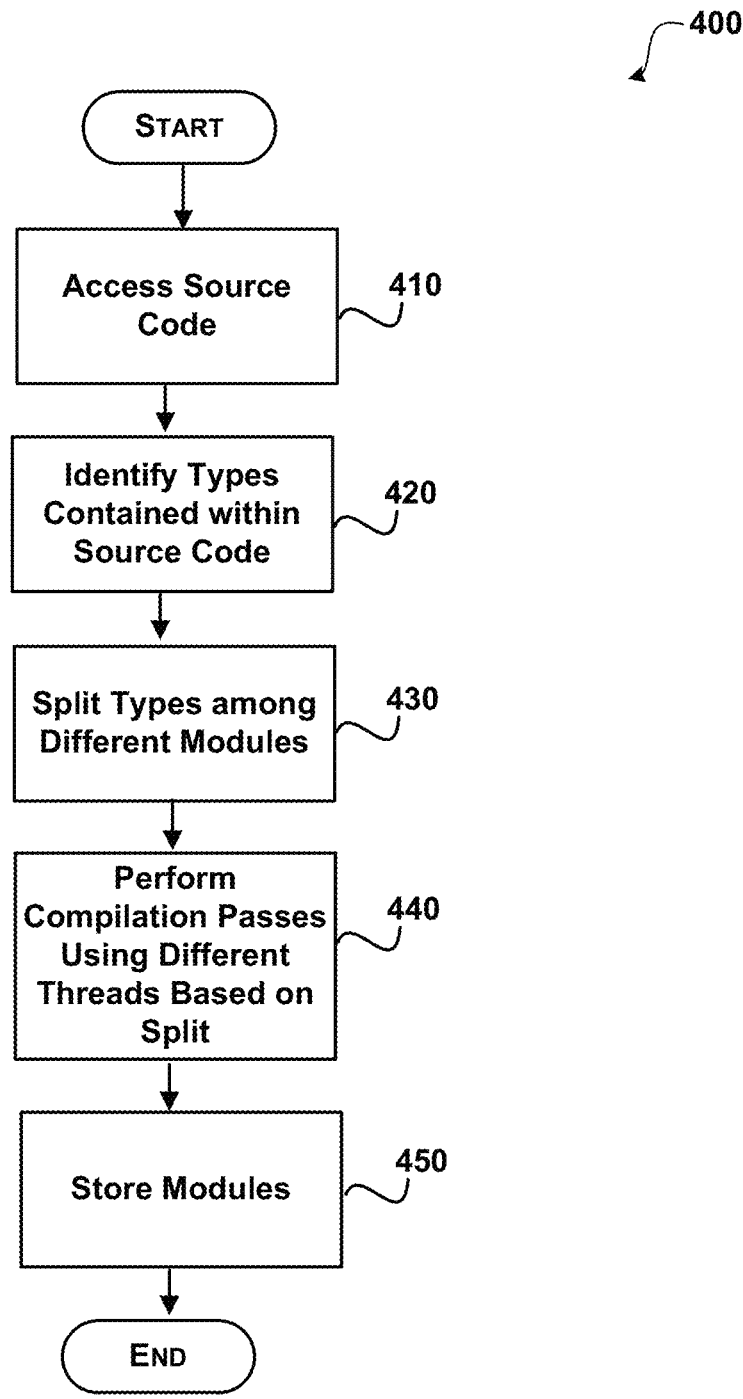
FIG. 4 illustrates a compilation process using parallel computation at different phases within the compilation phase.

FIG. 4 illustrates a compilation process using parallel computation at different phases within the compilation phase. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

After a start operation, the process moves to operation 410, where source code is accessed. The source code may be included in one or more files and written using one or more programming languages. For example, the source code may be written using C, C++, C#, X++, VISUAL BASIC, VISUAL BASIC .NET, and the like. According to an embodiment, the source code is written in X++.

Flowing to operation 420, the types contained within the source code are identified. For example, a parser may generate Abstract Syntax Trees (ASTs) that may be traversed to identify each of the different types.

Transitioning to operation 430, the types are split among different modules. The number of different modules used may be configured. The number of modules selected may depend on a variety of factors/conditions (e.g. available processes, number of determined types, available memory, . . . ). For example, a number of defined classes in the source code may be determined and split among a fixed number of modules corresponding to a number of available processors.

Flowing to operation 440, the compilation passes in the compilation pipeline are performed using different threads based on the splitting process. According to an embodiment, a thread is created for each created module and run in parallel with the processing of the other modules. During the compilation process, compilation errors are diagnosed and may be presented to the user. As the compilation proceeds, compiler metadata is written to a repository and/or memory that may be accessed by the other threads. The last phase of the compilation pipeline generates the executable code for the module.

Transitioning to operation 450, the modules are stored. For example, a file may be created for each module that was processed. According to an embodiment, the each module is a .NET module that forms an assembly that is associated with an application. The storage of the modules may also occur in parallel.

The process then moves to an end operation and returns to processing other actions.

Figure 5:
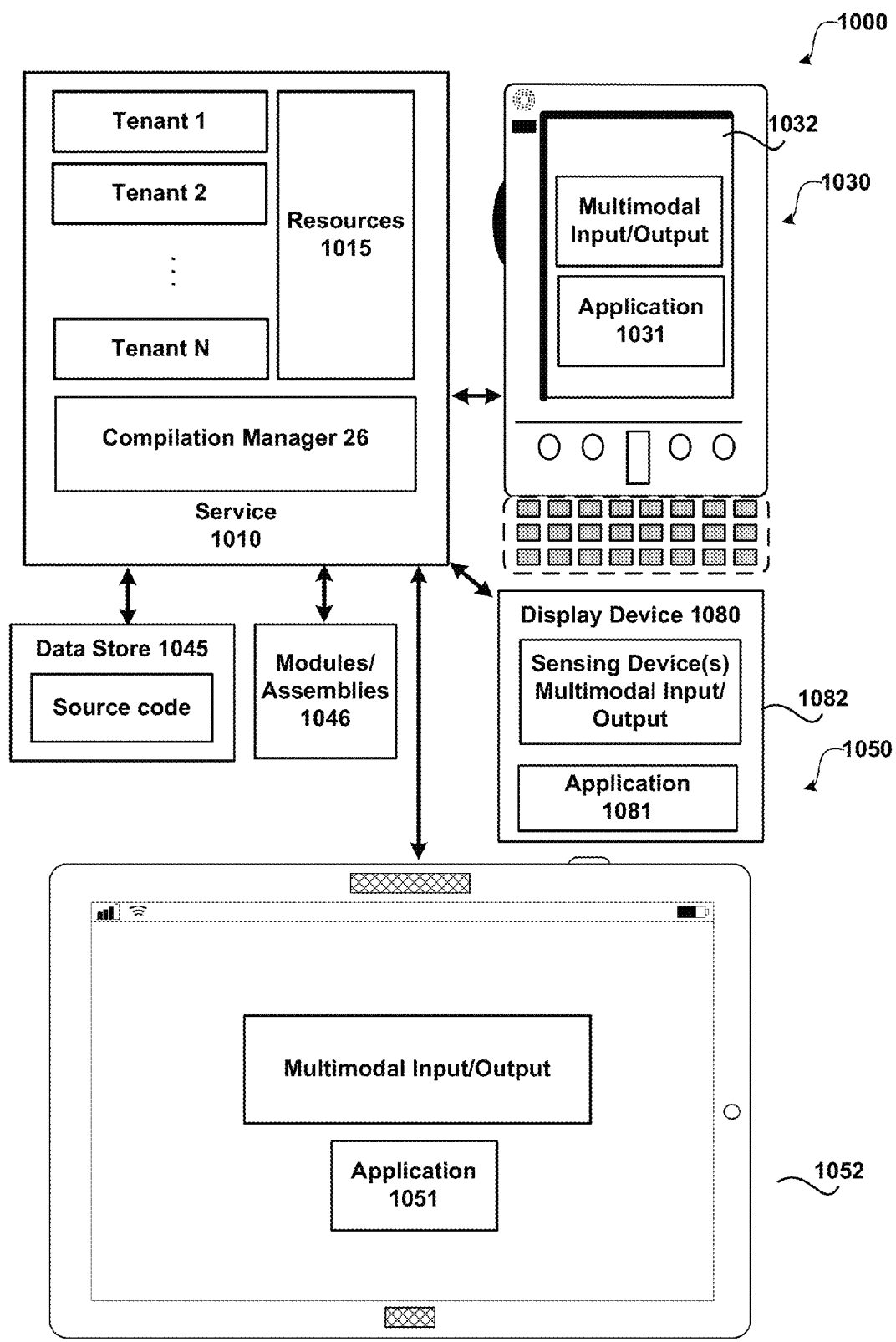
FIG. 5 illustrates an exemplary online system using deeply parallel source code compilation.

FIG. 5 illustrates an exemplary online system using deeply parallel source code compilation. As illustrated, system 1000 includes service 1010, data store 1045, modules/assemblies 1046, touch screen input device 1050 (e.g. a slate), smart phone 1030 and display device 1080.

As illustrated, service 1010 is a cloud based and/or enterprise based service that may be configured to provide services, such as multimodal services related to various applications (e.g. searching, games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include an application (1031, 1051, 1081).

As illustrated, touch screen input device 1050, smart phone 1030, and display device 1080 shows exemplary displays 1052/1032/1082 showing the use of an application using multimodal input/output. Data may be stored on a device (e.g. smart phone 1030, slate 1050 and/or at some other location (e.g. network data store 1045). Data store 1045, or some other store, may be used to store source code as well as other data. The applications used by the devices may be client based applications, server based applications, cloud based applications and/or some combination. According to an embodiment, display device 1080 is a device such as a MICROSOFT XBOX coupled to a display.

Compilation manager 26 is configured to perform operations relating to parallel computation of source code as described herein. For example, the applications 1031, 1051, 1081 may be compiled using compilation manager 26 as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
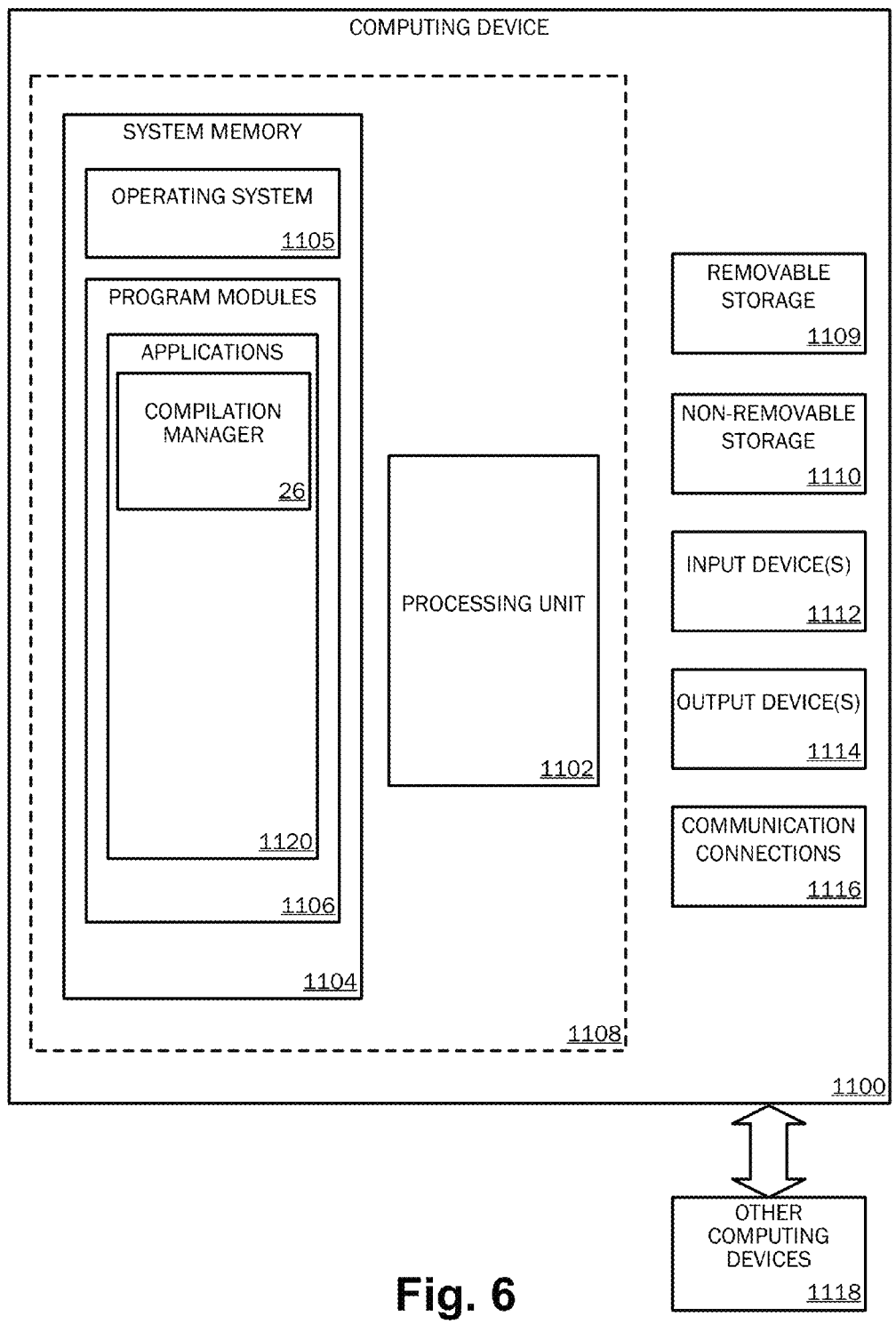
FIGS. 6, 7A, 7B and 8 and the associated descriptions provide a discussion of a variety of operating environments in which embodiments of the invention may be practiced.
Figure 7A:
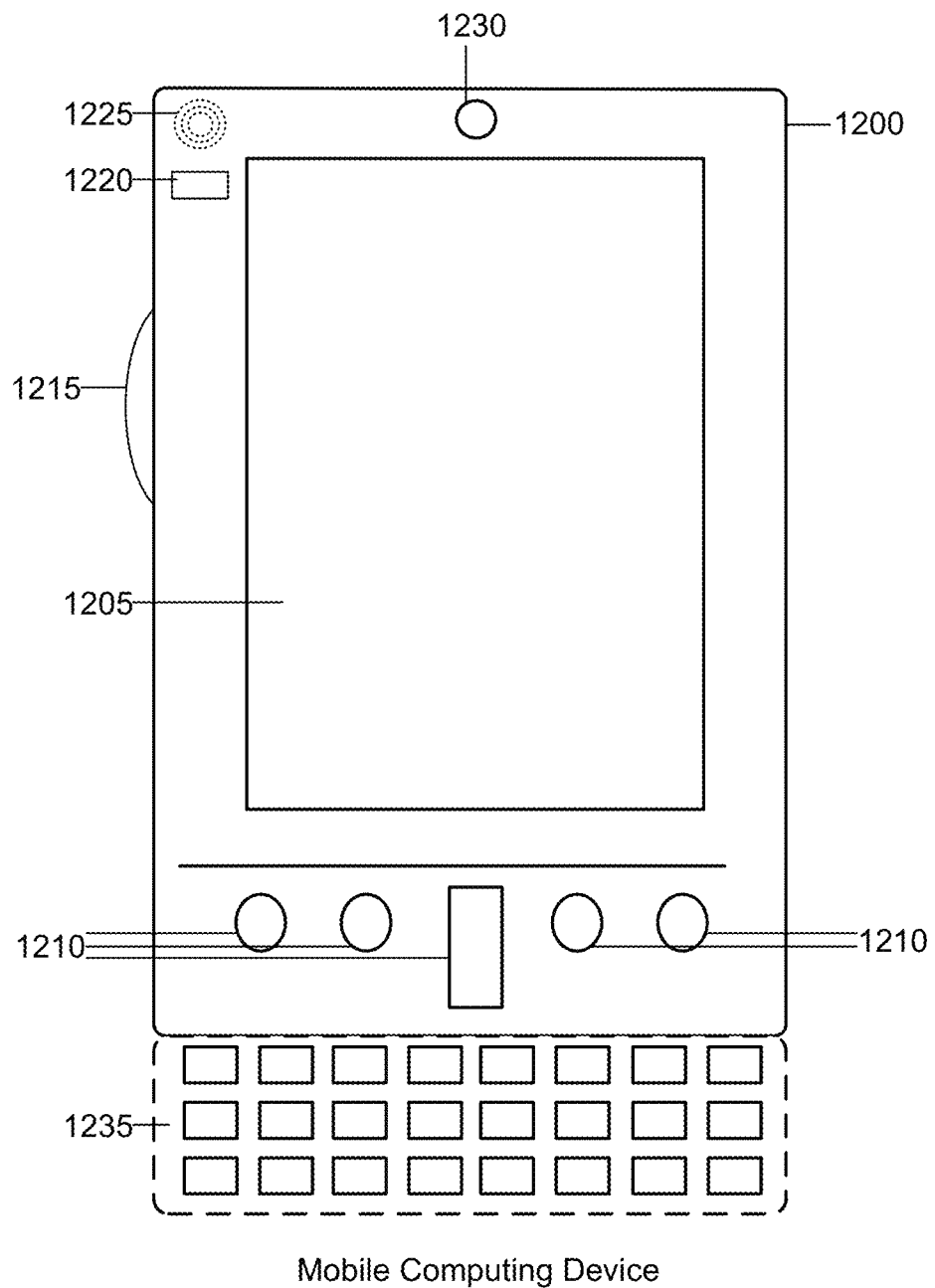
Figure 7B:
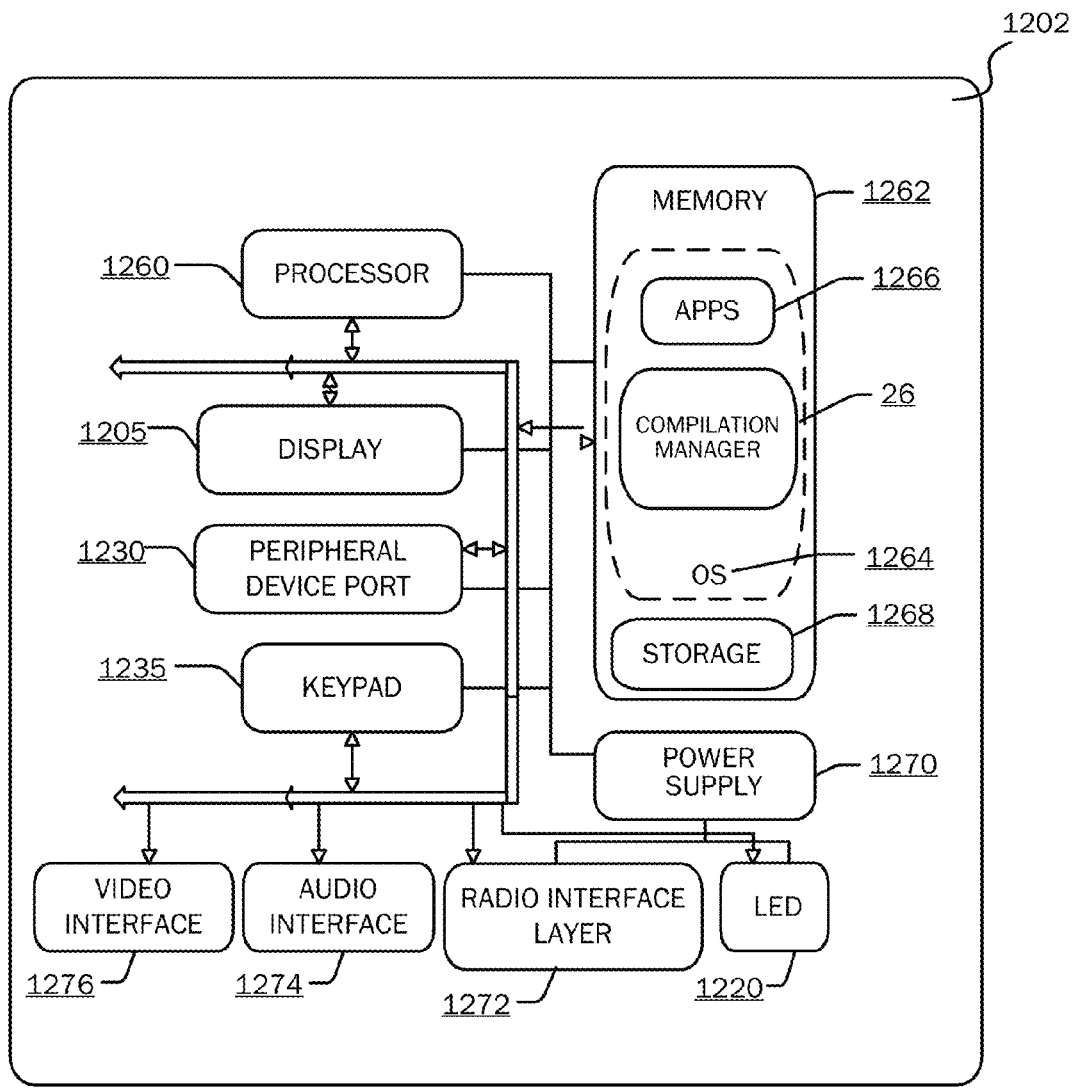
Figure 8:
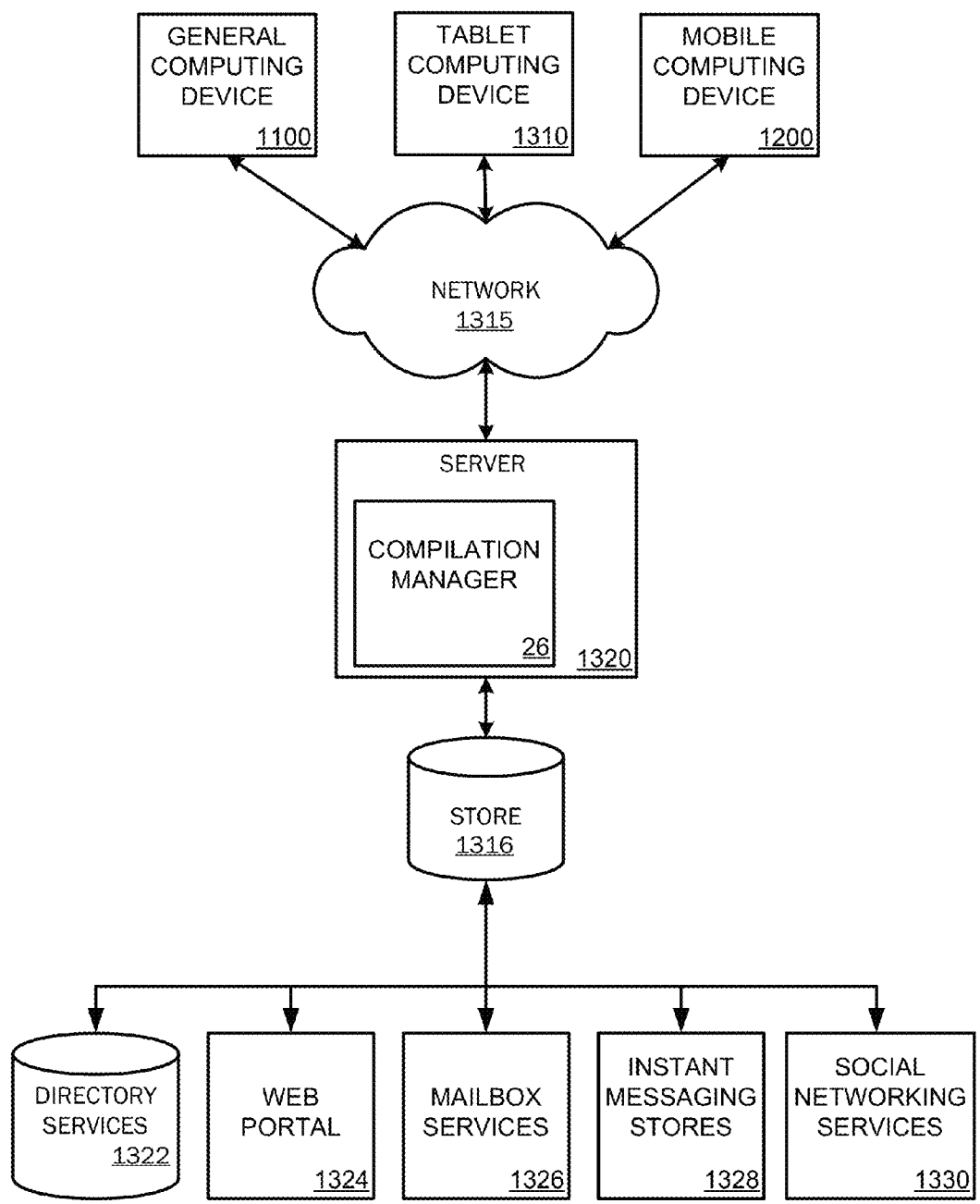

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the compilation manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 6 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 6 by a removable storage device 1109 and a non-removable storage device 1110.

As stated above, a number of program modules and data files may be stored in the system memory 1104. While executing on the processing unit 1102, the program modules 1106 (e.g., the compilation manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the compilation manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 1200, for example, a mobile telephone, a smart phone, a tablet personal computer, a laptop computer, and the like, with which embodiments of the invention may be practiced. With reference to FIG. 7A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the compilation manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 7B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 8 illustrates an embodiment of an architecture of a system for compiling source code, as described above. Content developed, interacted with, or edited in association with the compilation manager 26 may be stored in different communication channels or other storage types. For example, various documents may be stored using a directory service 1322, a web portal 1324, a mailbox service 1326, an instant messaging store 1328, or a social networking site 1330. The compilation manager 26 may use any of these types of systems or the like for enabling data utilization, as described herein. A server 1320 may provide the compilation manager 26 to clients. As one example, the server 1320 may be a web server providing the compilation manager 26 over the web. The server 1320 may provide the compilation manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for compiling source code in parallel, comprising:
   accessing the source code;
   identifying types contained within the source code, the types comprising at least one type;
   parsing the types identified in the source code to generate a plurality of Abstract Syntax Trees (ASTs), the plurality of ASTs being generated in parallel;
   adding semantic information to each of the plurality of ASTs to form a plurality of enriched ASTs;
   splitting, based on a name of the at least one type, the enriched ASTs to different modules that form an assembly, wherein the different modules are determined by classes in the source code;
   performing compilation for each of the different modules that is performed in parallel; and
   generating executable code for each of the modules.

2. The method of claim 1, wherein splitting the enriched ASTs to different modules that form an assembly comprises determining a number of modules to store the enriched ASTs and splitting the enriched ASTs to the number of modules.

3. The method of claim 1, wherein each module is an independent subdivision of the assembly that is part of a NET framework.

4. The method of claim 1, wherein identifying the types contained within the source code occurs in parallel.

5. The method of claim 1, wherein performing the compilation for each of the different modules comprises associating each module with a separate processing thread.

6. The method of claim 1, wherein performing the compilation for each of the different modules comprises further enriching an AST during passes of the compilation.

7. The method of claim 1, further comprising storing each of the modules in parallel after executable code for the modules are generated.

8. The method of claim 1, wherein splitting the enriched ASTs to different modules that form an assembly comprises determining a number of modules to split the enriched ASTs between based in part on a number of processors available for compilation.

9. A computer-readable memory storing computer-executable instructions for compiling source code in parallel, comprising:
   accessing the source code;
   identifying each of the types contained within the source code, the types comprising at least one type;
   parsing the types identified in the source code to generate a plurality of Abstract Syntax Trees (ASTs), the plurality of ASTs being generated in parallel;
   adding semantic information to each of the plurality of ASTs to form a plurality of enriched ASTs;
   splitting, based on a name of the at least one type, the enriched ASTs to different modules that form an assembly, wherein the different modules are determined by classes in the source code;
   performing compilation for each of the different modules that is performed in parallel; and
   storing executable code for each of the modules generated during the compilation using different processing threads.

10. The computer-readable memory of claim 9, wherein splitting the enriched ASTs to different modules that form an assembly comprises determining a number of modules to store the enriched ASTs and splitting the enriched ASTs to the number of modules.

11. The computer-readable memory of claim 9, wherein identifying the types contained within the source code occurs in parallel and wherein performing the compilation for each of the different modules comprises associating each module with a separate processing thread.

12. The computer-readable memory of claim 9, wherein performing the compilation for each of the different modules comprises further enriching an AST during passes of the compilation.

13. The computer-readable memory of claim 9, wherein storing the executable code occurs in parallel.

14. The computer-readable memory of claim 9, wherein splitting the enriched ASTs to different modules that form an assembly comprises determining a number of modules to split the enriched ASTs between based in part on a number of processors available for compilation.

15. A system for compiling source code in parallel, comprising:
   a processor and memory;
   an operating environment executing using the processor; and
   a compilation manager that is configured to perform actions comprising:
   accessing the source code;
   identifying each of the types contained within the source code;
   parsing the types identified in the source code to generate a plurality of Abstract Syntax Trees (ASTs), the plurality of ASTs being generated in parallel;
   adding semantic information to each of the plurality of ASTs to form a plurality of enriched ASTs;
   splitting, based on a name of one type, the enriched ASTs to different modules that form an assembly, wherein the different modules are determined by classes in the source code;
   performing compilation for each of the different modules that is performed in parallel; and
   storing executable code for each of the modules generated during the compilation using different processing threads.

16. The system of claim 15, wherein splitting the enriched ASTs to different modules that form an assembly comprises determining a number of modules to store the enriched ASTs and splitting the enriched ASTs to the number of modules based at least in part on a number of processors available for compilation.

17. The system of claim 15, wherein performing the compilation for each of the different modules comprises associating each module with a separate processing thread and storing the executable code occurs in parallel.

18. The system of claim 15, wherein performing the compilation for each of the different modules comprises further enriching an AST during passes of the compilation.

* * * * *